(12) United States Patent
Isaka et al.

(10) Patent No.: US 8,550,198 B2
(45) Date of Patent: Oct. 8, 2013

(54) CONSTRUCTION MACHINE

(75) Inventors: Wataru Isaka, Mito (JP); Nozomu Tanaka, Tsuchiura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 429 days.

(21) Appl. No.: 12/679,369

(22) PCT Filed: Feb. 17, 2009

(86) PCT No.: PCT/JP2009/052675
§ 371 (c)(1),
(2), (4) Date: Mar. 22, 2010

(87) PCT Pub. No.: WO2009/104592
PCT Pub. Date: Aug. 27, 2009

(65) Prior Publication Data
US 2010/0219008 A1    Sep. 2, 2010

(30) Foreign Application Priority Data
Feb. 22, 2008  (JP) .................................. 2008-41633

(51) Int. Cl.
*B60K 11/06* (2006.01)

(52) U.S. Cl.
USPC .......................................... 180/68.1; 180/291

(58) Field of Classification Search
USPC ............ 180/68.1, 28.4, 68.5, 68.6, 69.2, 291, 180/68.4; 123/41.58, 41.62, 41.65
See application file for complete search history.

(56) References Cited

U.S. PATENT DOCUMENTS

| | | | | |
|---|---|---|---|---|
| 5,816,350 A * | 10/1998 | Akira et al. | .................. | 180/68.1 |
| 5,816,351 A * | 10/1998 | Akira et al. | .................. | 180/68.1 |
| 6,655,486 B2 * | 12/2003 | Oshikawa et al. | ........... | 180/68.1 |
| 6,745,860 B2 * | 6/2004 | Yabe | ........................... | 180/68.1 |
| 6,922,925 B2 * | 8/2005 | Watanabe et al. | ............... | 37/466 |
| 7,134,518 B2 * | 11/2006 | Arai et al. | ..................... | 180/68.1 |
| 7,451,843 B2 * | 11/2008 | Nakashima et al. | ......... | 180/68.1 |
| 7,559,295 B2 * | 7/2009 | Yamada et al. | ............ | 123/41.31 |
| 7,841,314 B2 * | 11/2010 | Nakashima et al. | ...... | 123/198 E |
| 2001/0007292 A1 * | 7/2001 | Yabf | .......................... | 180/68.1 |
| 2008/0041332 A1 * | 2/2008 | Sakitani et al. | ........... | 123/198 E |
| 2008/0178825 A1 * | 7/2008 | Mitchell | .................... | 123/41.56 |
| 2011/0214931 A1 * | 9/2011 | Nakashima | ................. | 180/68.1 |

FOREIGN PATENT DOCUMENTS

| | | | |
|---|---|---|---|
| DE | 10100326 | * | 7/2001 |
| EP | 1 143 125 A1 | | 10/2001 |
| EP | 1 672 196 A1 | | 6/2006 |
| EP | 1 826 373 A1 | | 8/2007 |
| JP | 7-30321 U | | 6/1995 |

(Continued)

*Primary Examiner* — Katy M Ebner
*Assistant Examiner* — Emma K Frick
(74) *Attorney, Agent, or Firm* — Mattingly & Malur, PC

(57) ABSTRACT

In a heat exchanger cover (17) covering upper sides of heat exchanger (13), an inlet port (21) is provided on a left side which is an upstream side of cooling air, and one exhaust port (22) for exhausting the cooling air which has passed through the heat exchanger (13) is provided on a right side opposite to this inlet port (21). An engine cover (15) is provided with another exhaust port (23) at a position opposing the one exhaust port (22) in a left-right direction. The cooling air which has passed through the heat exchanger (13) can be exhausted horizontally from the exhaust port (22) provided in the heat exchanger cover (17) toward the exhaust port (23) provided in the engine cover (15).

4 Claims, 9 Drawing Sheets

(56) References Cited

FOREIGN PATENT DOCUMENTS

| | | |
|---|---|---|
| JP | 11-59202 A | 3/1999 |
| JP | 11-139171 A | 5/1999 |
| JP | 2000-303497 A | 10/2000 |
| JP | 2002-19260 A | 7/2002 |
| JP | 2003-147806 A | 5/2003 |
| JP | 2004-352066 A | 12/2004 |
| JP | 2005-145114 A | 6/2005 |

* cited by examiner ved in such a manner as to extend horizontally over upper sides of the respective mounted equipment and left and right side plates respectively extending downward from both left and right ends of the top plate toward the revolving frame. A large opening for the inspection and maintenance of the engine, the heat exchanger, and the like is provided in the top plate.
CONSTRUCTION MACHINE

TECHNICAL FIELD

The present invention relates to a construction machine such as a hydraulic excavator, a hydraulic crane, a wheel loader, or the like, and more particularly to a construction machine having an exterior cover which covers mounted equipment including an engine, or the like.

BACKGROUND ART

Generally, a hydraulic excavator as a construction machine is largely constituted by an automotive lower traveling structure, an upper revolving structure which is swingably mounted on the lower traveling structure, and a working mechanism liftably mounted on the front side of the upper revolving structure.

The upper revolving structure is largely constituted by a revolving frame serving as a support structure, an engine which is mounted on the rear side of the revolving frame and drives a hydraulic pump, a cooling fan which is rotatively driven by the engine, heat exchanger such as a radiator and an oil cooler which are provided in face-to-face relation to the cooling fan, and an exterior cover provided over the revolving frame to cover the mounted equipment such as the engine, the cooling fan, and the heat exchanger.

Here, the exterior cover is constituted by a top plate provided in such a manner as to extend horizontally over upper sides of the respective mounted equipment and left and right side plates respectively extending downward from both left and right ends of the top plate toward the revolving frame. A large opening for the inspection and maintenance of the engine, the heat exchanger, and the like is provided in the top plate.

Accordingly, an openable engine cover is attached to the top plate to close the aforementioned opening, and the engine cover is formed widely in the left-right direction so as to cover from the heat exchanger to the hydraulic pump. An inlet port is provided on the left side of the engine cover to suck cooling air from the outside toward the heat exchanger when the cooling fan is rotatively driven, while an exhaust port is provided on the right side thereof to exhaust to the outside the cooling air which has passed through the heat exchanger and the cooling fan (Patent Literature 1: Japanese Patent Laid-Open No. 2000-303497 A, and Patent Literature 2: Japanese Utility Model Laid-Open No. H7-30321).

Incidentally, with the hydraulic excavators according to the above-described patent literatures, the configuration provided is such that the engine cover is openably provided on the top plate of the exterior cover, and the inlet port and the exhaust port are provided in this engine cover.

Here, in performing such as the inspection operation and maintenance operation of the engine and the like, the engine cover is opened, and an operator gets on the top plate to perform the operation. However, in the case where the configuration provided is such that a large opening is provided in the top plate and this opening is covered by the engine cover, with a small-size hydraulic excavator in which the upper revolving structure is formed compactly, there is a problem in that it is impossible to secure a space for the operator to get on the top plate, so that the workability in the maintenance operation is aggravated.

Accordingly, with a small-size hydraulic excavator, it has been conceived to provide a small opening only on the upper side of the heat exchange device requiring periodic inspection operation, cleaning operation, and the like and to openably mount a heat exchanger cover to the top plate so as to cover only the heat exchange device. In this case, it is possible to secure a space for the operator to get on the top plate in the operation.

However, in the case of the configuration in which the upper side of the heat exchange device is covered by the small heat exchanger cover, the inlet port and the exhaust port provided in this heat exchanger cover would be located close to each other. For this reason, there is a problem in that a recirculation can occur in which warmed air discharged from the exhaust port is sucked again from the inlet port, causing deterioration in the cooling efficiency of fluids by the heat exchanger.

DISCLOSURE OF THE INVENTION

In view of the above-described problems with the prior art, it is an object of the present invention to provide a construction machine in which, even in a case where the inlet port and the exhaust port are provided in a small heat exchanger cover, the cooling air which is exhausted from the exhaust port can be exhausted to a location distant from the inlet port so as to prevent the re-sucking of warm air, thereby making it possible to improve the efficiency of cooling by the heat exchanger.

Another object of the present invention is to provide a construction machine in which the cooling air flowing inside the exterior cover by the cooling fan is guided toward the exhaust port provided in the engine cover, to thereby allow the cooling air to be efficiently circulated inside of the exterior cover.

(1) A construction machine in accordance with the present invention comprises: a vehicle frame which serves as a support structure and on a front side of which a working mechanism is mounted; a counterweight provided on a rear side of the vehicle frame; an engine mounted on the vehicle frame by being located on a front side of the counterweight; a hydraulic pump which is provided on one side in a left-right direction of the engine and is driven by the engine; a cooling fan which is provided for the engine by being located on an opposite side in the left-right direction to the hydraulic pump so as to suck cooling air from an outside; a heat exchange provided in face-to-face relation to the cooling fan by being located upstream of the cooling fan in a flowing direction of the cooling air; and an exterior cover provided on the vehicle frame to cover mounted equipment including the engine, the hydraulic pump, and the heat exchanger.

Further, to overcome the above-described problems, the construction machine according to the present invention is characterized in that the exterior cover comprising an engine cover provided over the engine, a heat exchanger cover which is openably provided over the heat exchanger in juxtaposition with the engine cover in the left-right direction and has a protruding upper surface protruding upwardly compared with an upper surface of the engine cover, and a side cover provided in face-to-face relation to the heat exchanger by being located on a side of the vehicle frame, that the heat exchanger cover is provided with an inlet port located on a side of the side cover to suck outside air as cooling air and one exhaust port located on a side of the engine cover to allow the cooling air which has passed through the heat exchanger to be exhausted in a horizontal direction above the engine cover, and that the engine cover is provided with another exhaust port for exhausting the cooling air at a position distant from the one exhaust port provided in the heat exchanger cover.

By virtue of this configuration, the cooling air which has passed through the heat exchanger and has become warm can be exhausted horizontally along the upper surface of the engine cover from the one exhaust port provided in the heat exchanger cover. In consequence, the warmed cooling air can be exhausted in the opposite direction away from the inlet port of the heat exchanger cover.

As a result, even with the structure in which the small heat exchanger cover is provided with the inlet port and the exhaust port, and the inlet port and the exhaust port are close to each other, the warm air exhausted from the exhaust port can be prevented from being sucked again into the inlet port, so that the inlet port is able to supply cool cooling air to the heat exchanger, thereby making it possible to improve the efficiency of cooling the fluid by the heat exchanger.

(2) In this instance, according to the present invention, the configuration provided is such that the heat exchanger cover has a vertical surface which extends substantially vertically downward from the protruding upper surface toward an upper surface of the engine cover, and the one exhaust port is provided in the vertical surface.

According to this configuration, since the one exhaust port can be provided in the vertical surface of the heat exchanger cover as a laterally faced opening, the operating sound (noise) of the engine can be prevented from leaking directly to the outside from the exhaust port, thereby making it possible to enhance the quietness during the operation. Further, the laterally faced exhaust port makes it possible to reduce the ingress of rainwater, dust, and the like into the exterior cover, and clogging by mud and the like can also be prevented.

(3) According to the present invention, the one exhaust port provided in the heat exchanger cover and the other exhaust port provided in the engine cover are configured to be arranged in juxtaposition with each other in the left-right direction. As a result, the cooling air exhausted from the other exhaust port is caused to flow in the direction away from the inlet port by the wind force of the cooling air exhausted horizontally from the one exhaust port, thereby making it possible to reliably prevent the re-sucking.

(4) According to the present invention, the configuration provided is such that a fire wall for shielding between the engine and the hydraulic pump is provided within the exterior cover, and the fire wall is provided with a flow guide plate for guiding the cooling air which has passed around the engine toward the other exhaust port. In consequence, even in a case where the leakage of the hydraulic oil has occurred in the surroundings of the hydraulic pump, it is possible to prevent the leaked hydraulic oil from scattering to the engine side, thereby making it possible to prevent a fire and the like in advance.

Moreover, since the fire wall is provided with the flow guide plate for guiding the cooling air which has passed around the engine toward the other exhaust port provided in the engine cover, even in the case where the fire wall which serves as an obstacle to the circulation of the cooling air is provided, the cooling air to be exhausted can be circulated smoothly toward the other exhaust port by the flow guide plate, thereby making it possible to efficiently cool the respective parts.

(5) According to the present invention, the flow guide plate is disposed at a position where the flow guide plate covers from above a muffler device for exhausting exhaust gases of the engine. In consequence, the cooling air can be exhausted smoothly from the other exhaust port while avoiding the muffler device serving as an obstacle inside the exterior cover. In addition, the flow guide plate is capable of shielding the noise occurring in the muffler device and is hence capable of reducing the sound volume during the operation.

(6) According to the present invention, the configuration provided is such that the counterweight is constituted by a central weight portion having a large height dimension and left and right lateral weight portions which are curved and extended toward the front side from the central weight portion in the left-right direction, and the rear side of the heat exchanger cover is disposed on an upper surface side of the central weight portion.

In consequence, the counterweight can be provided with a large weight in a limited space. The rear side of the heat exchanger cover can be disposed by making use of the upper surface side of the central weight portion of the counterweight.

(7) According to the present invention, the configuration provided is such that the construction machine comprises an automotive lower traveling structure, an upper revolving structure which is swingably mounted on the lower traveling structure, and the working mechanism which is liftably mounted at a central portion in the left-right direction on a front side of the upper revolving structure, wherein the vehicle frame is a revolving frame which constitutes the upper revolving structure and on a front side of which the working mechanism is mounted, the revolving frame being provided with a cab located laterally of the working mechanism and having an operator's seat in which an operator is seated, the engine being located on the front side of the counterweight and being disposed transversely on the revolving frame in such a manner as to extend in the left-right direction, and the heat exchanger being disposed on a rear side of the cab between the engine and the side cover.

DESCRIPTION OF REFERENCE NUMERALS

Figure 1:
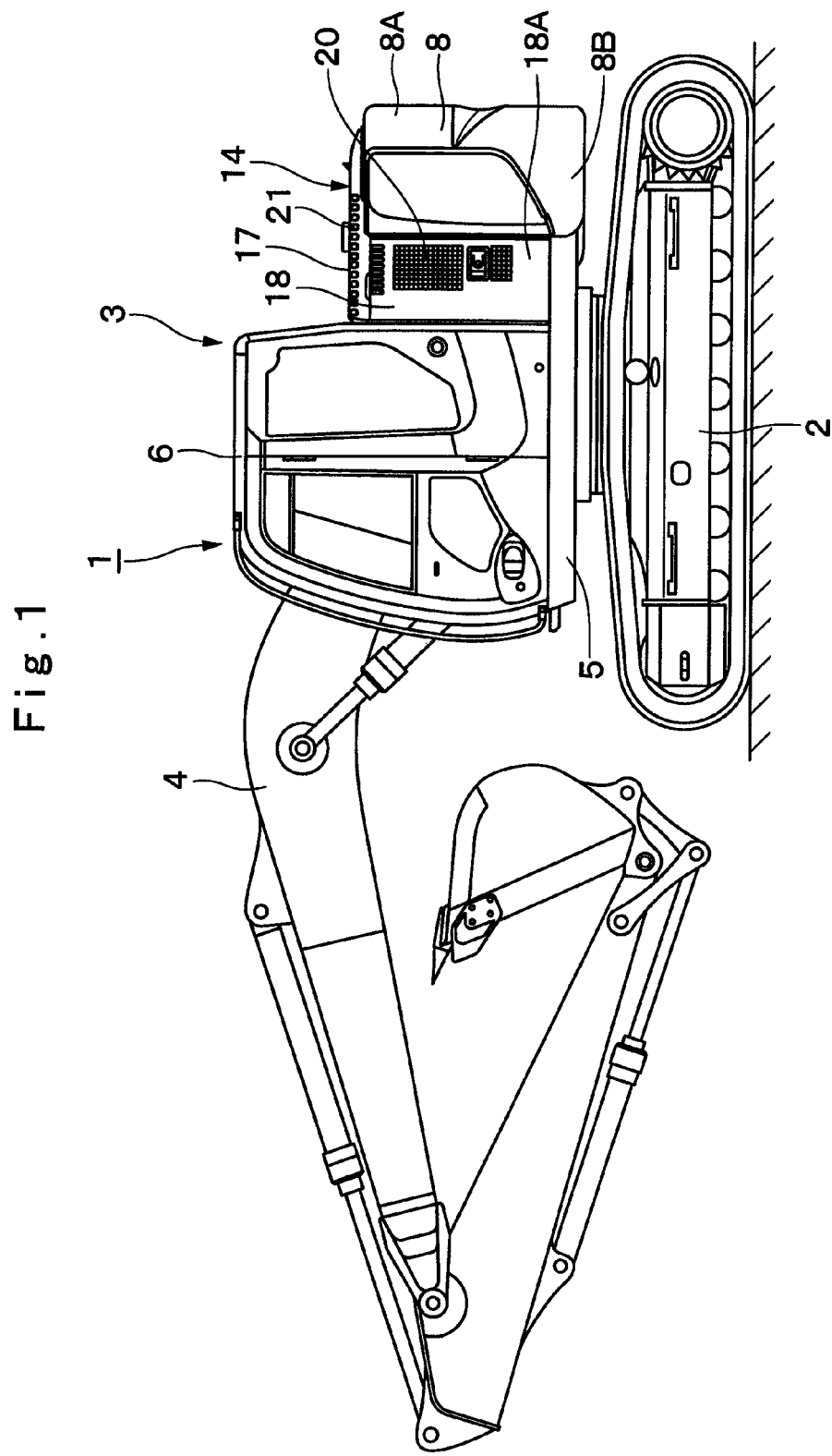
FIG. 1 is a front view illustrating a hydraulic excavator in accordance with an embodiment of the invention.

1: Hydraulic excavator (construction machine)
2: Lower traveling structure (vehicle body)
3: Upper revolving structure (vehicle body)
4: Working mechanism
5: Revolving frame (vehicle frame)
6: Cab
7: Operator's seat
8: Counterweight
8A: Central weight portion
8B: Left lateral weight portion
8C: Right lateral weight portion
8D: Upper surface 9: Engine (mounted equipment)
10: Muffler device
10A: Exhaust pipe
10B: Muffler
11: Hydraulic pump
12: Cooling fan
13: Heat exchanger (mounted equipment)
14: Exterior cover
15: Engine cover
16: Opening
17: Heat exchanger cover
17A: Peripheral portion
17B: Protruding upper surface
17C: Vertical surface
18: Left side door cover (left side cover)
19: Right side door cover (right side cover)
20: Left side inlet port
21: Inlet port
22: One exhaust port
23: Right exhaust port (other exhaust port)
24: Fire wall
25: Flow guide plate

BEST MODE FOR CARRYING OUT THE INVENTION

Hereafter, with reference to FIGS. 1 to 9, a detailed description will be given by citing a crawler type hydraulic excavator as an example of a construction machine in accordance with an embodiment of the present invention.

In FIG. 1, designated at 1 is a crawler type hydraulic excavator as a construction machine, and the hydraulic excavator 1 is largely constituted by an automotive lower traveling structure 2, an upper revolving structure 3 which is swingably mounted on the lower traveling structure 2 and constitutes a vehicle body together with the lower traveling structure 2, and a working mechanism 4 liftably mounted on the front side of the upper revolving structure 3 to perform the operation of such as excavating earth and sand.

Figure 2:
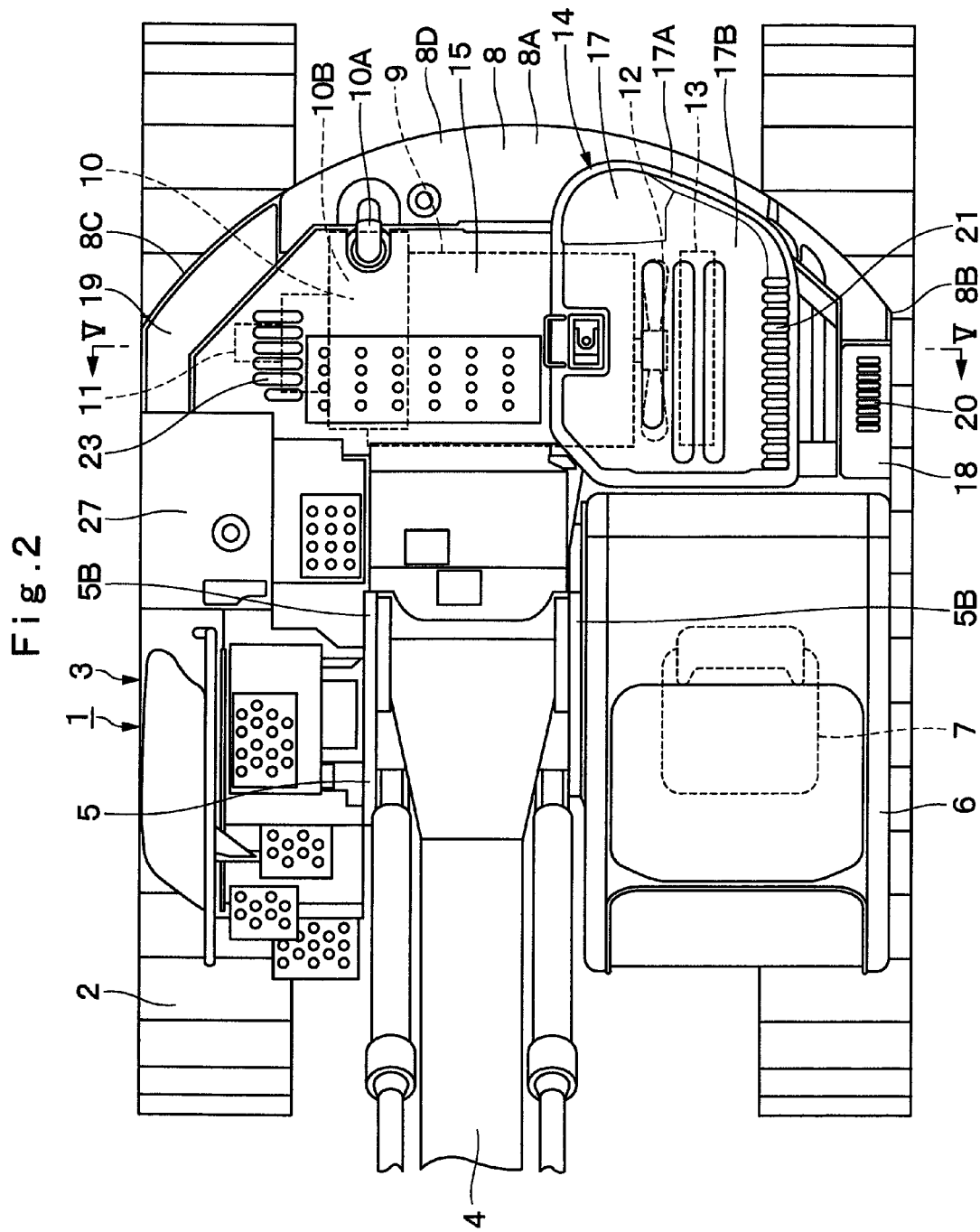
FIG. 2 is a plan view illustrating in enlarged form the hydraulic excavator shown in FIG. 1.
Figure 5:
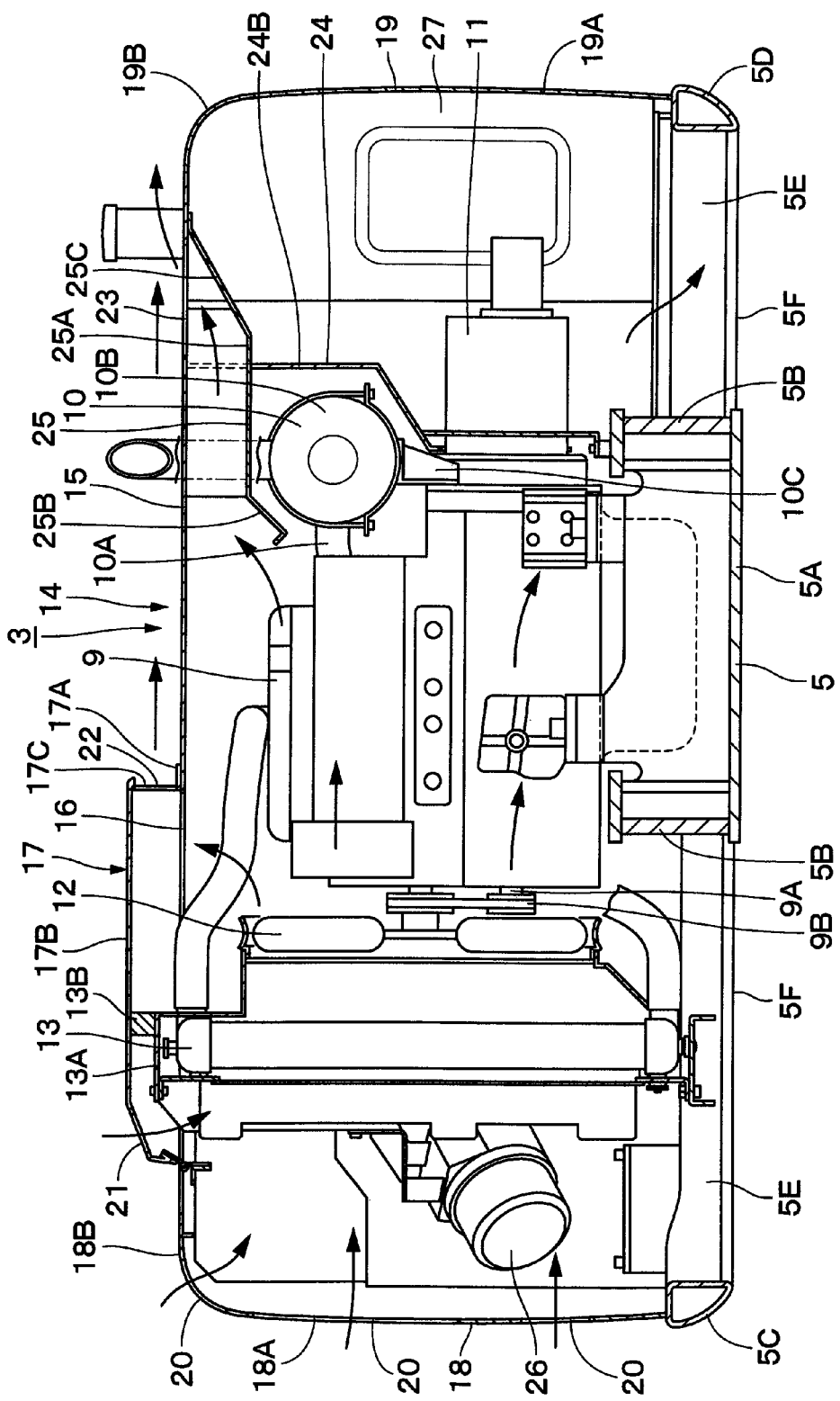
FIG. 5 is an enlarged cross-sectional view of the upper revolving structure, taken in the direction of arrows V-V in FIG. 2.

Indicated at 5 is a revolving frame serving as a vehicle frame constituting a part of the upper revolving structure 3, and the revolving frame 5 is formed as a support structure. Further, as shown in FIG. 5, the revolving frame 5 is largely constituted by a bottom plate 5A consisting of a thick-walled steel plate or the like extending in the front-rear direction, left and right vertical plates 5B provided uprightly on the bottom plate 5A and extending in the front-rear direction with a predetermined interval in a central portion in the left-right direction, a left side frame 5C and a right side frame 5D each disposed at an interval to the left and to the right of the respective one of the vertical plates 5B and extending in the front-rear direction, a plurality of extension beams 5E whose proximal end portions are secured to the bottom plate 5A and the vertical plate 5B and which extend in the left-right direction and respectively support the left and right side frames 5C and 5D at their distal end sides, and a plurality of under covers 5F provided between the bottom plate 5A and each of the side frames 5C and 5D. Further, as shown in FIG. 2, the working mechanism 4 is liftably mounted to the revolving frame 5 on the front sides of the respective vertical plates 5B.

Indicated at 6 is a cab which is mounted on the left front side of the revolving frame 5, namely, located laterally of the working mechanism 4, and an operator rides in the cab 6. Disposed inside the cab 6 are an operator's seat 7 in which the operator is seated, an operation lever for traveling, an operation lever for work operation, and the like (none are shown).

Figure 3:
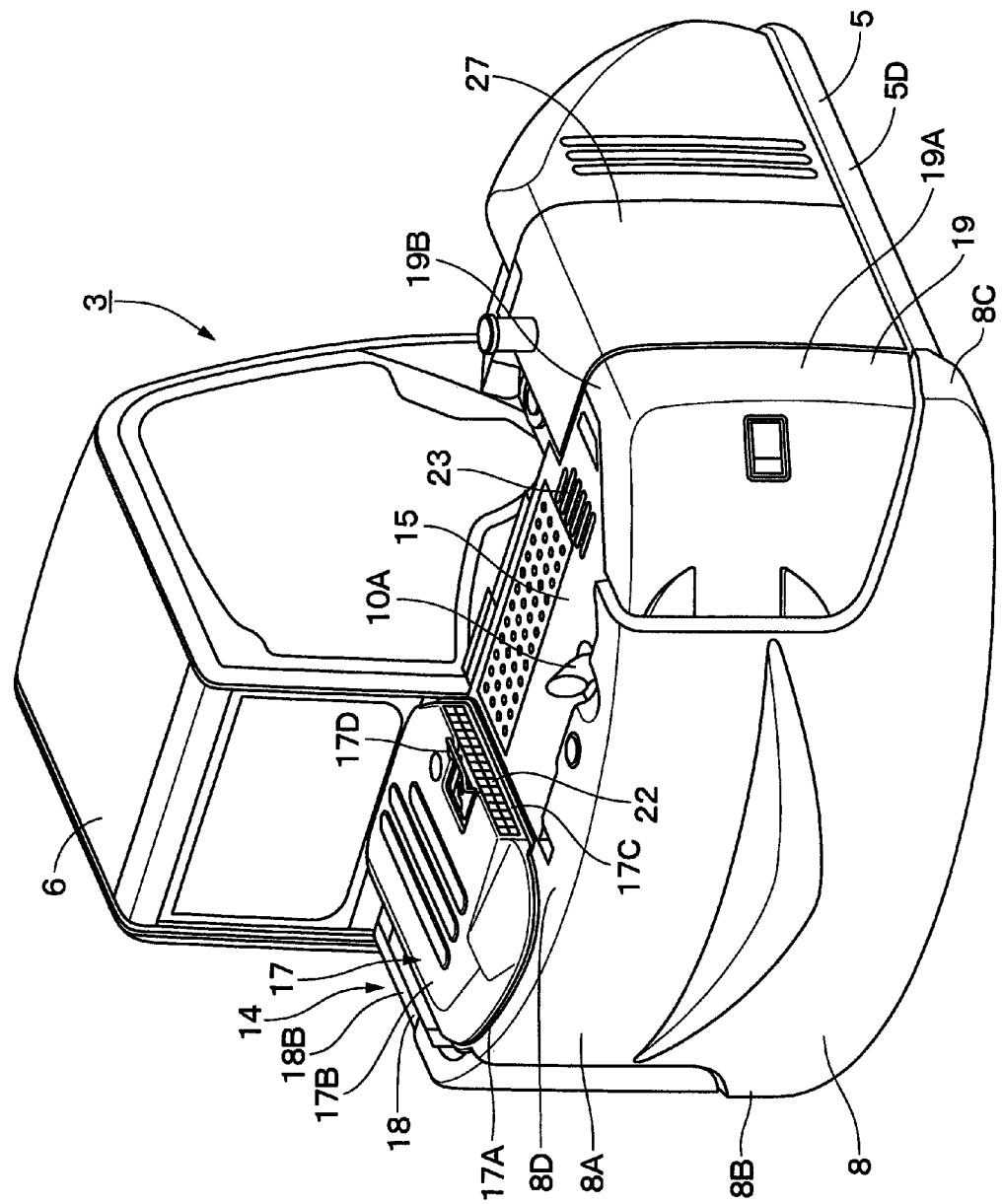
FIG. 3 is an external perspective view of an upper revolving structure, taken from the right rear side.
Figure 4:
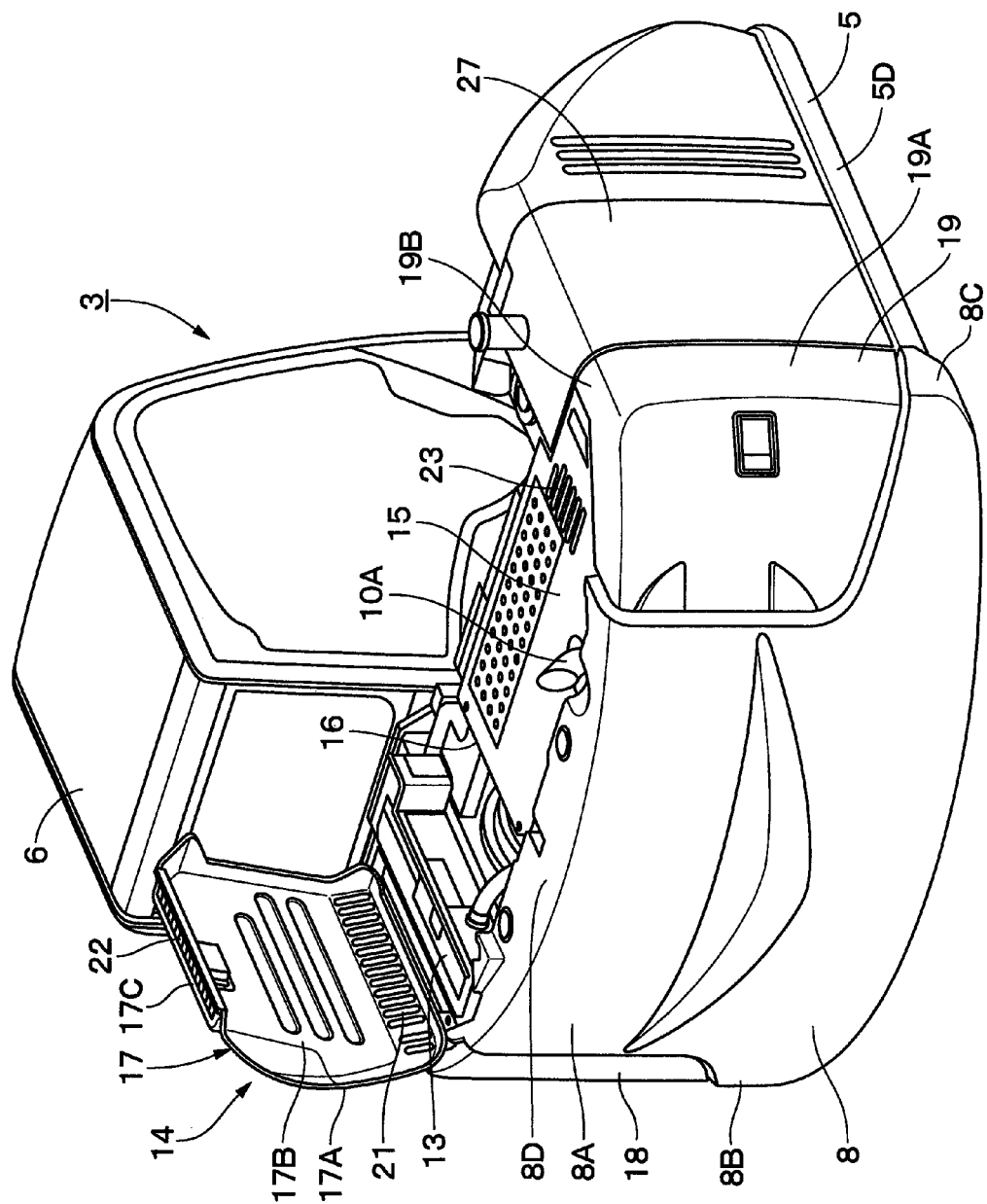
FIG. 4 is an external perspective view, taken from a position similar to that of FIG. 3, of the upper revolving structure with a heat exchanger cover open.

Designated at 8 is a counterweight which is mounted on a rear end portion of the revolving frame 5. This counterweight 8 is formed as a circular arc-shaped heavy load for keeping a weight balance with the working mechanism 4. More specifically, as shown in FIGS. 3 and 4, the counterweight 8 is constituted by a central weight portion 8A having a large height dimension and projecting upward by being located in a central portion in the left-right direction, and left and right lateral weight portions 8B and 8C which are curved toward the front side while extending from that central weight portion 8A in the left-right direction.

Here, the left and right lateral weight portions 8B and 8C are provided nearer the lower side of the central weight portion 8A and have a small height dimension. In consequence, the overall shape of the counterweight 8 is formed in a chevron shape with its central portion projecting upward. As for the central weight portion 8A, its upper surface 8D is located at substantially the same height position as that of an engine cover 15 which will be described hereinafter, and a rear end side of a heat exchanger cover 17 is disposed on its upper side.

Indicated at 9 is an engine which is one of the mounted equipment and is provided on the rear side of the revolving frame 5. The engine 9 is located on the front side of the counterweight 8 and is mounted in a transversely mounted state in which it extends in the left-right direction. As shown in FIG. 5, the engine 9 is provided with an output shaft 9A whose axis extends in the left-right direction. A below-described cooling fan 12, a generator (not shown), and the like are rotatively connected to this output shaft 9A by means of a belt 9B. Meanwhile, a hydraulic pump 11, which discharges hydraulic oil as pressure oil by being driven by the output shaft 9A, is mounted on one side (right side in the embodiment) in the left-right direction of the engine 9.

Further, the engine 9 is provided with a muffler device 10 for exhausting exhaust gas to the outside. This muffler device 10 is largely constituted by an exhaust pipe 10A which is connected to the exhaust side of the engine 9, a substantially cylindrical muffler 10B provided in a midway portion of the exhaust pipe 10A in such a manner as to extend in the front-rear direction on the right upper portion of the engine 9, and a bracket 10C for mounting the muffler 10B to the engine 9.

Indicated at 12 is the suction type cooling fan which is provided for the engine 9 by being located on the opposite side (left side in the embodiment) in the left-right direction to the hydraulic pump 11 as to sandwich the engine 9. As the cooling fan 12 is rotatively driven by the engine 9, the cooling fan 12 sucks the outside air as cooling air through an inlet port 21 of the heat exchanger cover 17 of a below-described exterior cover 14 and left side inlet ports 20 of a left side door cover 18 thereof, and supplies this sucked cooling air to below-described heat exchanger 13. Part of the cooling air which has passed through the heat exchanger 13 and has become warm is exhausted to the outside from an exhaust port 22 of the heat exchanger cover 17, while the other cooling air is flowed around the engine 9 to the right direction and is exhausted to the outside from a right exhaust port 23 of the engine cover 15 and the bottom side of the revolving frame 5.

Denoted at 13 is the heat exchanger provided on the revolving frame 5 by being located on the rear side of the cab 6. This heat exchanger 13 constitutes a part of the mounted equipment which is mounted on the revolving frame 5, and is constituted by, for example, such as a radiator for cooling engine cooling water and an oil cooler for cooling hydraulic oil. The heat exchanger 13 is provided between the cab 6 and the counterweight 8 so as to oppose the cooling fan 12 by being located upstream of the cooling fan 12 in the flowing direction of the cooling air, namely, between the below-described left side door cover 18 and the cooling fan 12.

Further, the periphery of the heat exchanger 13 is surrounded by a support frame 13A for rectification, and a seal member 13B is provided on top of that support frame 13A in such a manner as to extend in the front-rear direction for preventing the warm air which has passed through the heat exchanger 13 from recirculating by providing a seal function between the below-described heat exchanger cover 17.

The configuration of the exterior cover 14 which covers the mounted equipment such as the engine 9, the muffler device 10, the hydraulic pump 11, the cooling fan 12, and the heat exchanger 13 will be described next.

Indicated at 14 is the exterior cover provided over the revolving frame 5, and this exterior cover 14 covers the engine 9, the heat exchanger 13, and the like which are provided as the mounted equipment, and is largely constituted by the engine cover 15, the heat exchanger cover 17, the left side door cover 18, and a right side door cover 19, which will be described hereinafter.

Here, the hydraulic excavator 1 in accordance with this embodiment is configured as an ultra-small revolving machine whose upper revolving structure 3 is capable of revolving substantially within the vehicular width of the lower traveling structure 2. For this reason, the upper revolving structure 3 has the counterweight 8 disposed forwardly of the rear end of the lower traveling structure 2, and is formed compactly so that the rear side of the counterweight 8 becomes substantially circular shape.

As the upper revolving structure 3 is thus formed compactly, the space for installing the heat exchanger 13 becomes small. For this reason, in order to obtain the required cooling performance, the heat exchanger 13 needs to be formed upwardly large (upwardly high). Therefore, the heat exchanger 13 has their upper position projecting upwardly of the installation position of the engine cover 15 for constituting the exterior cover 14. In consequence, the heat exchanger cover 17 for covering the heat exchanger 13 has the protruding upper surface 17B protruding upwardly compared with the engine cover 15.

Namely, indicated at 15 is the engine cover for constituting a part of the exterior cover 14, and the engine cover 15 is provided so as to cover the upper side of the engine 9 by being located rearwardly of the working mechanism 4 and forwardly of the central weight portion 8A of the counterweight 8. In this case, the engine cover 15 is fixedly mounted in an unopenable state by such means as bolting, welding, or the like. More specifically, the engine cover 15 is formed of a plate which is located on the right side of the heat exchanger cover 17 and extends substantially horizontally among the counterweight 8, the below-described right side door cover 19, and a fuel tank 27, so as to cover the upper sides of the engine 9, the muffler device 10, and the hydraulic pump 11, as shown in FIGS. 2 and 5. In addition, the engine cover 15 is disposed at substantially the same height position as that of the central weight portion 8A of the counterweight 8.

In this case, since the engine cover 15 is formed as a large plate which covers the upper side of the engine 9, it is possible to secure a space for the operator to get on when performing such as the inspection operation and the maintenance operation of the heat exchanger 13 and the like, so that the operator is able to easily engage in the operation by getting on the engine cover 15. Further, the engine cover 15 is provided with the below-described right exhaust port 23 for exhausting the cooling air at a position distant from the exhaust port 22 provided in the heat exchanger cover 17.

Indicated at 16 is an opening which is formed between the engine cover 15 and the below-described left side door cover 18 at a position sandwiched between the counterweight 8 and the cab 6. As shown in FIGS. 4 and 5, this opening 16 is for opening the upper sides of such as the heat exchanger 13 and the belt 9B of the engine 9, which require routine inspection operation, periodic cleaning operation, and the like, so as to provide an access to them.

Designated at 17 is the heat exchanger cover which is openably provided over the heat exchanger 13 to close the opening 16. This heat exchanger cover 17 is disposed in juxtaposition with the engine cover 15 and the left side door cover 18 in the left-right direction, and constitutes a substantially trapezoidal lid member for opening and closing the opening 16. The heat exchanger cover 17 has a left end portion openably attached by hinges or the like to a structure constituting the exterior cover 14 or a structure constituting the revolving frame 5.

Figure 6:
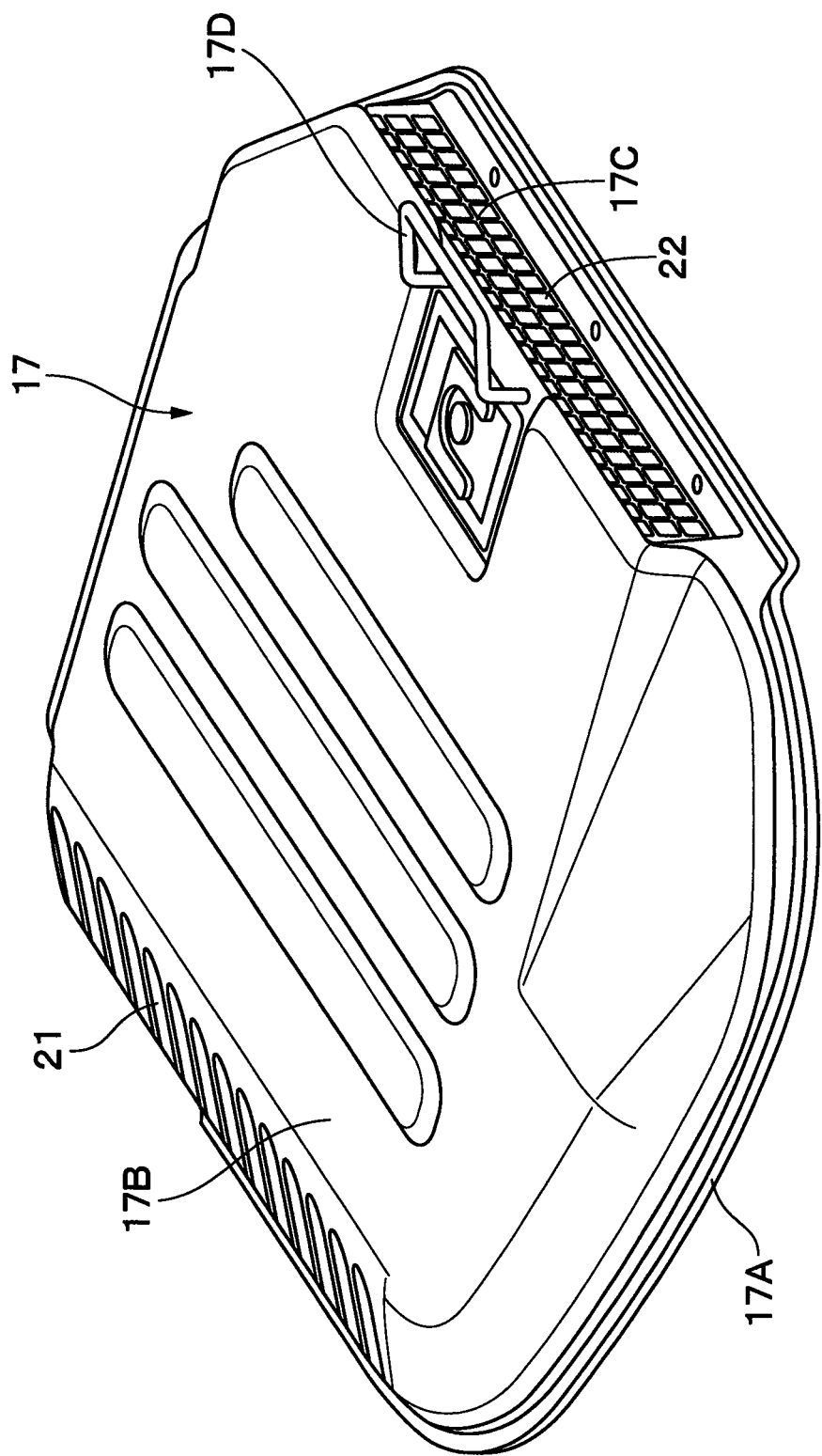
FIG. 6 is an external perspective view illustrating the heat exchanger cover in enlarged form.

Further, as shown in FIGS. 2 and 6, the heat exchanger cover 17 has a peripheral edge portion 17A abutting against the upper surface of the engine cover 15 and the upper surface 8D of the central weight portion 8A of the counterweight 8, and a central side of the heat exchanger cover 17 protrudes upward from the peripheral edge portion 17A to form the protruding upper surface 17B. In consequence, the heat exchanger cover 17 is able to cover the upwardly large heat exchanger 13 by the protruding upper surface 17B.

Meanwhile, a right-side end portion of the heat exchanger cover 17 is formed as a vertical surface 17C which extends substantially vertically downward from the protruding upper surface 17B toward the upper surface of the engine cover 15. This vertical surface 17C is for allowing the below-described one exhaust port 22 to be open horizontally, and is formed as a rectangular surface portion which is elongated in the front-rear direction at a position slightly receded from the right end portion of the protruding upper surface 17B. In addition, the heat exchanger cover 17 is provided with a handle 17D for opening and closing by being located on the upper side of the vertical surface 17C. Further, the below-described inlet port 21 is provided on the left side of the heat exchanger cover 17 by being located leftwardly of the heat exchanger 13, and the exhaust port 22 is provided on the right side of the heat exchanger cover 17 at the position of the vertical surface 17C. In this case, the exhaust port 22 is open at a position spaced apart rightwardly of the cooling fan 12.

Indicated at 18 is the left side door cover serving as a left side cover constituting the left side of the exterior cover 14, and the left side door cover 18 has, for example, a front portion openably attached to the structure constituting the exterior cover 14 or the structure constituting the revolving frame 5. Further, when the left side door cover 18 is opened, it is possible to perform such as the inspection operation, maintenance operation, and cleaning operation of the heat exchanger 13, a below-described air cleaner 26, and the like.

The left side door cover 18 is constituted by a side portion 18A located in face-to-face relation to the heat exchanger 13 and provided uprightly on the left side frame 5C serving as a side surface of the revolving frame 5, and a curved portion 18B formed by bending an upper portion of that side portion 18A in the right direction. Further, the side portion 18A and the curved portion 18B of the left side door cover 18 are provided with the below-described left side inlet ports 20.

Indicated at 19 is the right side door cover serving as a right side cover constituting the right side of the exterior cover 14, and the right side door cover 19 is constituted by a side portion 19A provided uprightly on the right side frame 5D of the revolving frame 5 and a curved portion 19B formed by bending an upper portion of that side portion 19A in the left direction. Further, when the right side door cover 19 is opened, it is possible to perform such as the inspection operation of the hydraulic pump 11, hydraulic device (not shown), and the like.

Next, a description will be given of the left side inlet ports 20 provided in the left side door cover 18 of the exterior cover 14, the inlet port 21 provided in the heat exchanger cover 17, the exhaust port 22 provided in the heat exchanger cover 17, and the right exhaust port 23 provided in the engine cover 15.

Indicated at 20 are the plurality of left side inlet ports 20 which are provided in the side portion 18A and the curved portion 18B of the left side door cover 18. The left side inlet ports 20 are formed as multiplicities slit-like openings or square-like openings which are juxtaposed with each other. Each left side inlet port 20 sucks the outside air as the cooling air when the cooling fan 12 is rotatively driven.

Designated at 21 is the inlet port which is provided in the heat exchanger cover 17, and the inlet port 21 is provided by being located on the left side door cover 18 side of the protruding upper surface 17B, namely, on the upstream side of the heat exchanger 13 in the flowing direction of the cooling air. In substantially the same way as a part of the left side inlet ports 20, the inlet port 21 of the heat exchanger cover 17 is formed as a multiplicity of slit-like openings which are juxtaposed in the front-rear direction. Further, in the same way as each left side inlet port 20, the inlet port 21 sucks the outside air as the cooling air when the cooling fan 12 is rotatively driven.

Designated at 22 is the one exhaust port provided in the heat exchanger cover 17. This exhaust port 22 is provided on the right side which is the engine cover 15 side opposite to the inlet port 21, namely, in the vertical surface 17C of the heat exchanger cover 17. The exhaust port 22 is formed as a multiplicity of square-like openings which are juxtaposed in the vertical surface 17C. Further, as the exhaust port 22 is provided in the vertical surface 17C, the exhaust port 22 allows the cooling air which has passed through the heat exchanger 13 to be exhausted in the horizontal direction above the engine cover 15.

Here, the exhaust port 22 provided in the small heat exchanger cover 17 is close to the inlet port 21. However, the exhaust port 22 is open rightwardly of the cooling fan 12 and is able to exhaust the cooling air horizontally along the upper surface of the engine cover 15. In consequence, the cooling air which has passed through the heat exchanger 13 and has become warm can be exhausted in the opposite direction away from the inlet port 21, thereby making it possible to prevent the warm air exhausted from the exhaust port 22 from being sucked again into the inlet port 21.

On the other hand, in the case where the exhaust port 22 is provided in the vertical surface 17C, the operating sound (noise) of the engine 9 does not directly leak from the exhaust port 22 which is open in a laterally faced manner, and part of the operating sound which collided against the protruding upper surface 17B of the heat exchanger cover 17 leaks from the exhaust port 22. In addition, the laterally faced exhaust port 22 makes it possible to reduce the ingress of rainwater, dust, and the like into the exterior cover 14, and mud and the like are difficult to be deposited, so that clogging can also be prevented.

Further, as the cooling air is exhausted from the one exhaust port 22 in the horizontal direction, the cooling air exhausted from the right exhaust port 23 can be pushed rightward by its wind force. In consequence, it is possible to prevent the cooling air exhausted from the right exhaust port 23 from being sucked again into the inlet ports 20 and 21.

Designated at 23 is the right exhaust port serving as another exhaust port provided on the right side of the engine cover 15. This right exhaust port 23 is disposed at a position rightwardly distant from the exhaust port 22 provided in the heat exchanger cover 17 and by being juxtaposed with the exhaust port 22 in the left-right direction, and is for exhausting the cooling air which has passed around the engine 9. For this reason, the right exhaust port 23 is disposed above the hydraulic pump 11 which is located rightwardly of the engine 9.

In addition, the right exhaust port 23 is widely spaced apart from the respective inlet ports 20 and 21 in the left-right direction, and is capable of exhausting the cooling air diagonally upward right by a second inclined plate 25C of a below-described flow guide plate 25, so that it is possible to prevent a recirculation in which the exhausted cooling air is sucked again into the respective inlet ports 20 and 21.

Next, a description will be given of a fire wall 24 for preventing the scattering of hydraulic oil to the engine 9 side by shielding between the engine 9 and the hydraulic pump 11.

Figure 7:
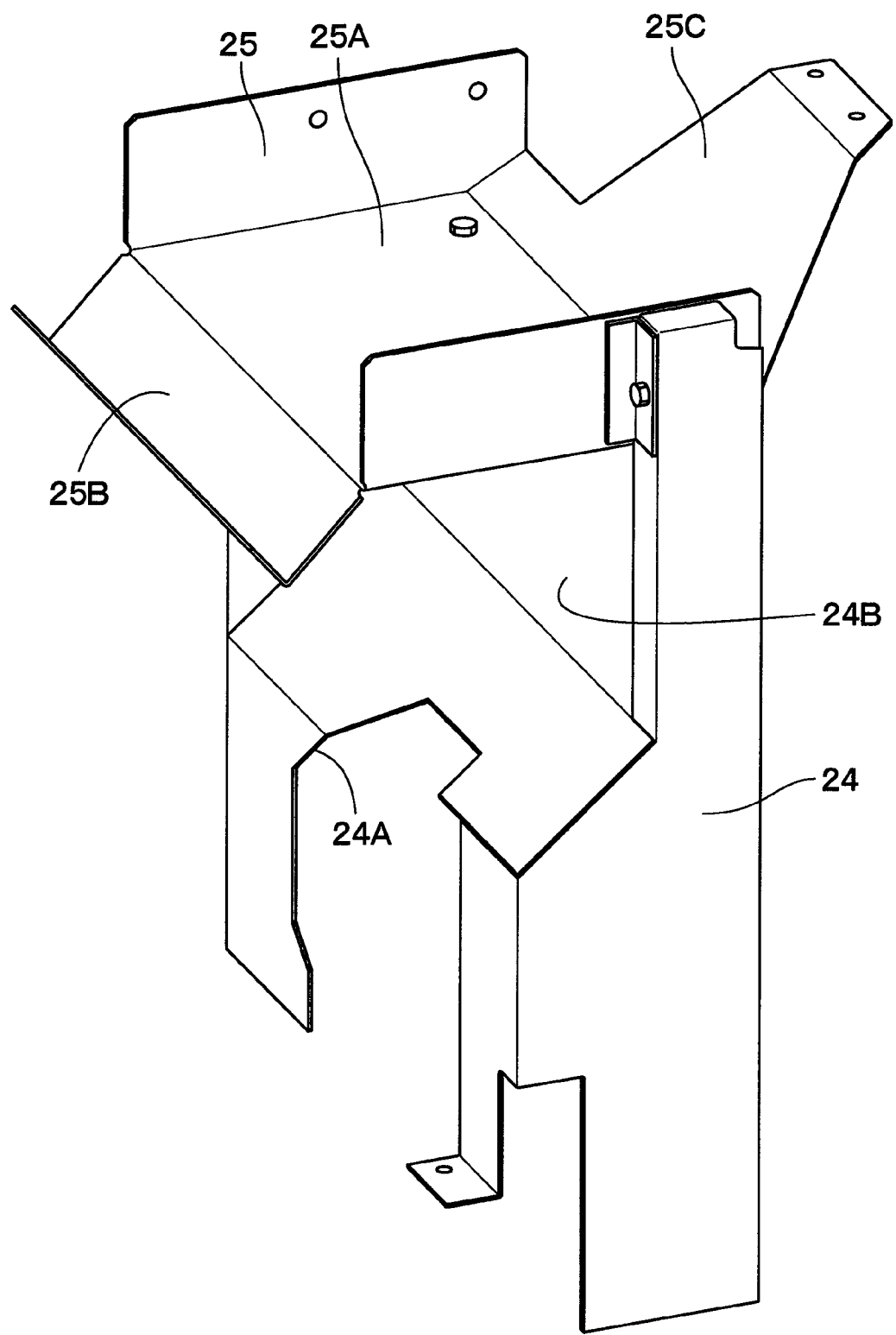
FIG. 7 is an external perspective view illustrating in enlarged form a fire wall and a flow guide plate in an assembled state.
Figure 8:
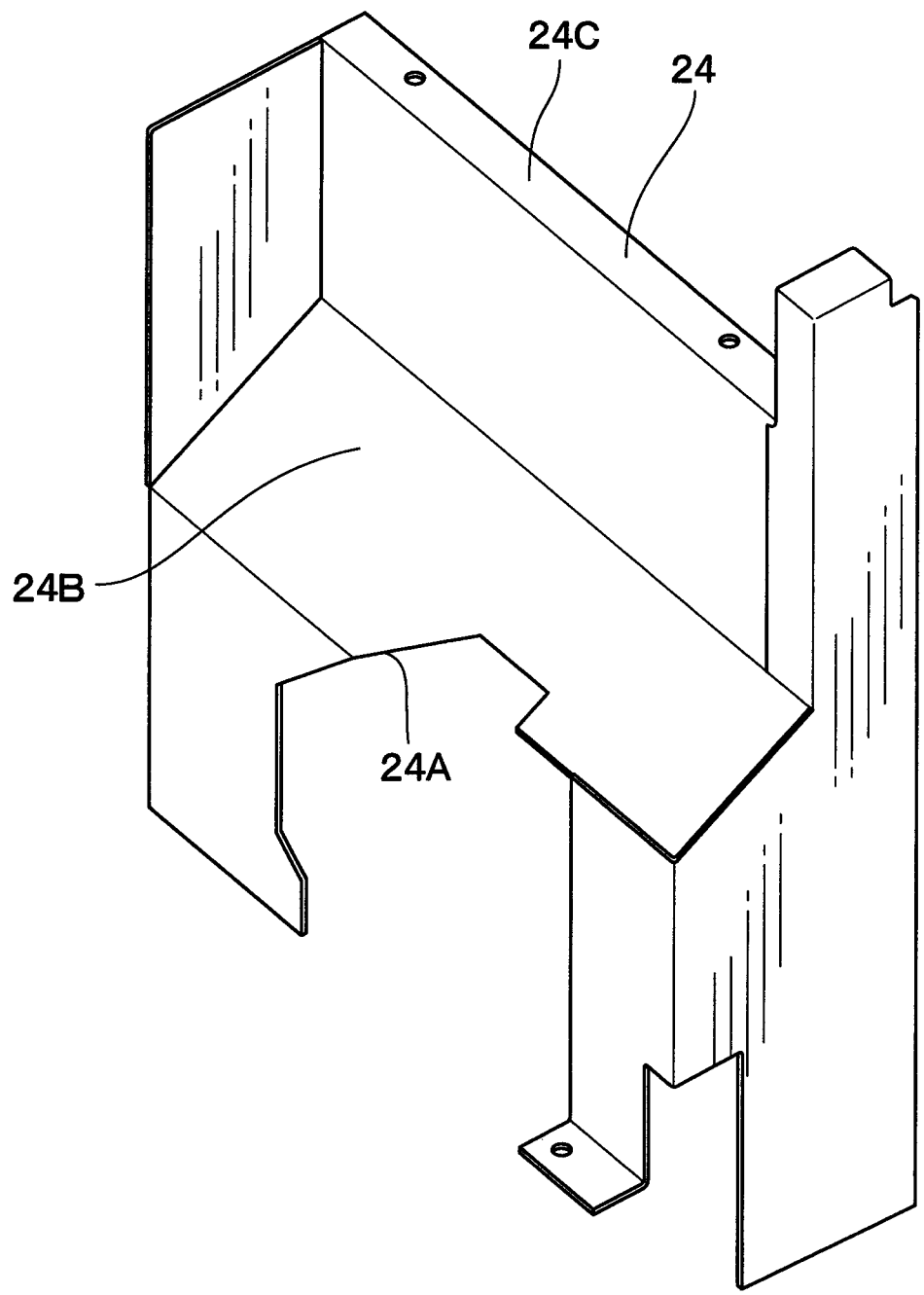
FIG. 8 is an external perspective view illustrating the fire wall in FIG. 7 as a single unit.

Designated at 24 is the fire wall provided in the exterior cover 14, and the fire wall 24 shields between the engine 9 and the hydraulic pump 11. This fire wall 24 is formed as a structure having strength against vibration, bending, and the like by bending a plurality of steel sheets and securing them together. Specifically, as shown in FIGS. 7 and 8, a notched opening 24A, which straddles a mounting base of the hydraulic pump 11 for mounting to the engine 9, is formed in a lower side of the fire wall 24, and the upper side of that notched opening 24A is formed as a recessed step portion 24B which is receded for accommodating the muffler 10B of the muffler device 10. A mounting portion 24C for mounting the below-described flow guide plate 25 is formed on an upper end portion of the recessed step portion 24B.

Further, a lower portion of the fire wall 24 is attached to the vertical plate 5B of the revolving frame 5, and an upper portion thereof is attached to the engine cover 15 via the flow guide plate 25. In consequence, even in a case where the leakage of the hydraulic oil has occurred in the surroundings of the hydraulic pump 11, the fire wall 24 is able to prevent the leaked hydraulic oil from scattering to the engine 9 side, thereby making it possible to prevent a fire and the like in advance.

Figure 9:
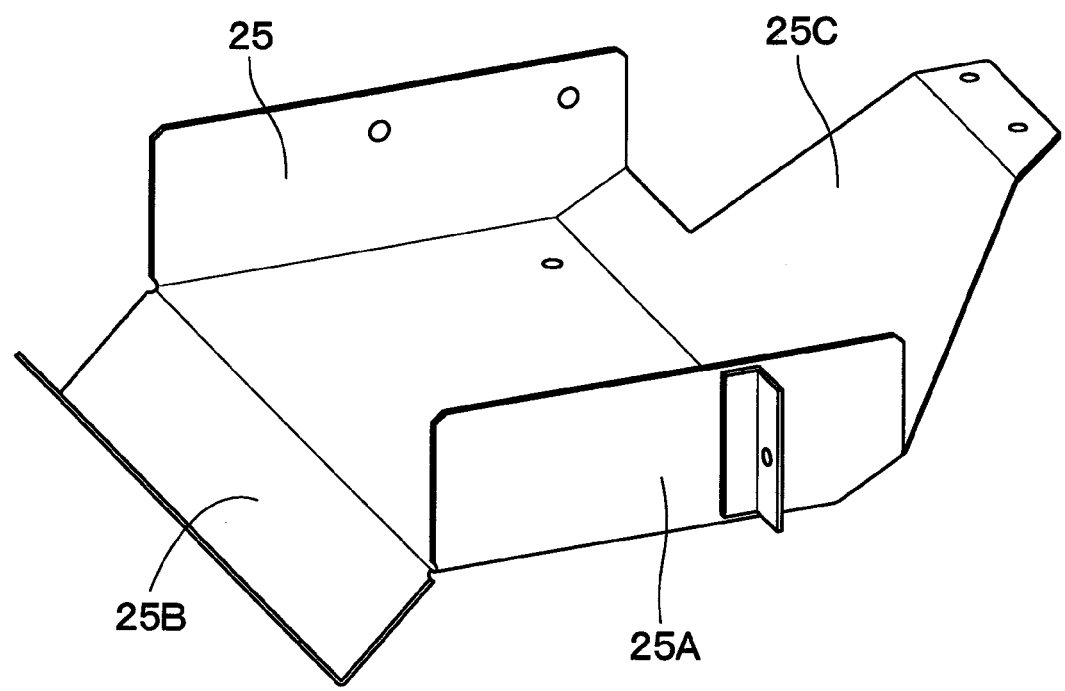
FIG. 9 is an external perspective view illustrating the flow guide plate in FIG. 7 as a single unit.

Indicated at 25 is the flow guide plate provided on the upper portion of the fire wall 24 in such a manner as to cover the muffler 10B of the muffler device 10. This flow guide plate 25 is for allowing the cooling air which has passed around the engine 9 to be guided toward the right exhaust port 23 of the engine cover 15 while avoiding the muffler 10B of the muffler device 10. As shown in FIGS. 7 and 9, the flow guide plate 25 is formed by, for instance, bending a steel plate, and is constituted by a gutter-shaped main body portion 25A, a first inclined plate 25B extending downward from the main body portion 25A to the left side so as to guide the cooling air upward, and the second inclined plate 25C extending upward from the main body portion 25A to the right side so as to guide the cooling air to the right exhaust port 23 of the engine cover 15.

In consequence, the flow guide plate 25 is able to exhaust the cooling air to the outside by guiding it to the right exhaust port 23 of the engine cover 15 so as to avoid the fire wall 24 serving as an obstacle to the circulation of the cooling air, thereby making it possible to efficiently cool such as the surroundings of the engine 9. Thereby, since that portion of the flow guide plate 25 which is connected to the right exhaust port 23 is the second inclined plate 25C, the cooling air can be exhausted diagonally upward right by this second inclined plate 25C, so that the cooling air which is exhausted can be moved away from the respective inlet ports 20 and 21.

Moreover, since the flow guide plate 25 is disposed at a position where it covers the muffler 10B of the muffler device 10 from above, the cooling air can be exhausted smoothly from the right exhaust port 23 of the engine cover 15 while avoiding the muffler 10B serving as an obstacle inside the exterior cover 14. In addition, the flow guide plate 25 is capable of shielding the noise occurring in the muffler device 10 and is hence capable of reducing the sound volume during the operation.

It should be noted that designated at 26 is the air cleaner disposed between the left side door cover 18 and the heat exchanger 13, and the air cleaner 26 is connected to the inlet side of the engine 9 to supply clean air to the engine 9. Further, denoted at 27 is the fuel tank provided on the revolving frame 5 by being located on the front side of the hydraulic pump 11, and the fuel tank 27 stores fuel which is supplied to the engine 9.

The hydraulic excavator 1 in accordance with this embodiment has the above-described configuration, and its operation will be described next.

First, the operator rides in the cab 6 and is seated in the operator's seat 7. In this state, as the operator manipulates the operation lever for traveling, the lower traveling structure 2 can be driven to move the hydraulic excavator 1 forward or backward. As the operator seated in the operator's seat 7 manipulates the operation lever for work operation, it is possible to perform such as the operation of excavating earth and sand by lowering and raising the working mechanism 4.

When the hydraulic excavator 1 is thus being operated, cooling air is supplied to the heat exchanger 13 by the cooling fan 12 of the engine 9. Accordingly, a description will be given of the flow of the cooling air within the exterior cover 14 with reference to FIG. 5.

First, if the cooling fan 12 is rotatively driven, the outside air is sucked as the cooling air through the left side inlet ports 20 provided in the left side door cover 18 of the exterior cover 14 and the inlet port 21 provided in the heat exchanger cover 17, and this cooling air is supplied to the heat exchanger 13, making it possible to cool fluids such as the engine cooling water and the hydraulic oil.

Besides, of the cooling air which has passed through the heat exchanger 13 and has become warm, part of the cooling air is exhausted to the outside from the one exhaust port 22 provided in the heat exchanger cover 17. At this time, since the exhaust port 22 exhausts the warmed cooling air horizontally along the upper surface of the engine cover 15, it is possible to prevent the warm air exhausted from the exhaust port 22 from being sucked again into the inlet port 21.

Meanwhile, the remaining cooling air circulates around the engine 9 toward the right, and part of it is exhausted to the outside from the right exhaust port 23 provided in the engine cover 15. At this time, the flow guide plate 25 provided on the fire wall 24 is able to exhaust the cooling air to the outside by guiding it to the right exhaust port 23 of the engine cover 15 so as to avoid the fire wall 24 and the muffler 10B of the muffler device 10 which serve as obstacles to the circulation of the cooling air. In this case, since that portion of the flow guide plate 25 which is connected to the right exhaust port 23 is the second inclined plate 25C, the cooling air can be exhausted from the right exhaust port 23 diagonally upward right along the angle of the second inclined plate 25C.

Further, the right exhaust port 23 is disposed at a position where it is juxtaposed with the exhaust port 22 of the heat exchanger cover 17 in the left-right direction. In consequence, the cooling air exhausted from the exhaust port 23 is pushed rightward by the wind force of the cooling air exhausted from the one exhaust port 22 in the horizontal direction, and flows in the direction away from the respective inlet ports 20 and 21, thereby making it possible to reliably prevent the re-sucking.

Furthermore, the remaining cooling air which has circulated around the engine 9 toward the right is exhausted to the outside from the opening provided in the under cover 5F of the revolving frame 5.

As such, according to this embodiment, the configuration provided is such that the heat exchanger cover 17 of the exterior cover 14 is provided with the inlet port 21 for sucking the outside air as the cooling air by being located on the left side, and the exhaust port 22 for exhausting the cooling air which has passed through the heat exchanger 13 is provided on the right side opposite to this inlet port 21, the exhaust port 22 being adapted to exhaust the cooling air horizontally along the upper surface of the engine cover 15. Therefore, the cooling air which has passed through the heat exchanger 13 and has become warm can be exhausted horizontally along the upper surface of the engine cover 15 from the exhaust port 22 provided in the heat exchanger cover 17, so that the warmed cooling air can be exhausted in the opposite direction away from the inlet port 21 of the heat exchanger cover 17.

As a result, even with the structure in which the small heat exchanger cover 17 is provided with the inlet port 21 and the exhaust port 22, and the inlet port 21 and the exhaust port 22 are close to each other, the warmed cooling air exhausted from the exhaust port 22 can be prevented from being sucked again into the inlet port 21. In consequence, the inlet port 21 is able to supply cool cooling air to the heat exchanger 13, thereby making it possible to improve the cooling efficiency of fluids such as the engine cooling water and hydraulic oil by the heat exchanger 13.

Here, since the exhaust port 22 is provided in the vertical surface 17C of the heat exchanger cover 17, this exhaust port 22 can be made a laterally faced opening, so that the operating sound of the engine 9 can be prevented from leaking directly toward the upper side from the exhaust port 22, thereby making it possible to enhance the quietness during the operation. Accordingly, the laterally faced exhaust port 22 makes it possible to reduce the ingress of rainwater, dust, and the like into the exterior cover 14, and clogging by mud and the like can also be prevented.

In addition, since the exhaust port 22 provided in the heat exchanger cover 17 and the exhaust port 23 provided in the engine cover 15 are arranged in juxtaposition with each other in the left-right direction, the one exhaust port 22 exhausts the cooling air horizontally to the right and is thereby able to rightwardly push the cooling air exhausted from the other exhaust port 23. In consequence, the cooling air exhausted from the right exhaust port 23 provided in the engine cover 15 flows in the direction away from the inlet ports 20 and 21 and is hence able to prevent the re-sucking of the cooling water more reliably.

Meanwhile, since the fire wall 24 for shielding between the engine 9 and the hydraulic pump 11 is provided within the exterior cover 14, even in a case where the leakage of hydraulic oil has occurred in the surroundings of the hydraulic pump 11, it is possible to prevent the leaked hydraulic oil from scattering to the engine 9 side, thereby making it possible to prevent a fire and the like in advance and improve the reliability.

In this case, the fire wall 24 is provided with the flow guide plate 25 for guiding the cooling air which has passed around the engine 9 toward the right exhaust port 23 provided in the engine cover 15. As a result, the cooling air to be exhausted can be circulated smoothly toward the right exhaust port 23 by the flow guide plate 25 while avoiding such as the fire wall 24 and the muffler 10B of the muffler device 10 which serve as obstacles to the circulation of the cooling air, thereby making it possible to efficiently cool the surroundings of the engine 9 and the like.

In addition, since the flow guide plate 25 is disposed at a position where it covers the muffler 10B of the muffler device 10 from above, the cooling air can be exhausted smoothly from the right exhaust port 23 while avoiding the muffler 10B serving as an obstacle inside the exterior cover 14. Accordingly, the flow guide plate 25 is capable of shielding the noise occurring in the muffler device 10 and is hence capable of reducing the sound volume during the operation.

Further, since the counterweight 8 is constituted by the central weight portion 8A having a large height dimension and the left and right lateral weight portions 8B and 8C which have a small height dimension and are curved toward the front side while extending from that central weight portion 8A in the left-right direction, the counterweight 8 can be provided with a large weight in a limited space. In addition, the rear side of the heat exchanger cover 17 can be disposed by making use of the upper surface side of the central weight portion 8A of the counterweight 8.

It should be noted that, in the embodiment, a description has been given by citing as an example the case in which the engine 9 is provided with the cooling fan 12. However, the present invention is not limited to the same, and a configuration may be provided such that, for example, the cooling fan is provided separately from the engine and is rotatively driven by use of an electric motor, a hydraulic motor, or the like to supply cooling air to the heat exchange device.

Further, although the engine cover 15 has been described as being fixedly mounted in an unopenable state, but may be configured so as to be mounted openably or dismountably by removing the bolts or the like.

Meanwhile, the left side door cover 18 and the right side door cover 19 which constitute the exterior cover 14 are not limited to openable covers, and may be fixed type side covers which are not opened or closed. In addition, as for the left and right side door covers 18 and 19, one of them may be an openable type cover, and the other one may be a fixed type cover.

Furthermore, in the embodiment, a description has been given by citing as an example of construction machines the hydraulic excavator 1 having the crawler type lower traveling structure 2. However, the present invention is not limited to the same, and may be applied to a hydraulic excavator having, for example, a wheel type lower traveling structure. In addition to it, the present invention is also widely applicable to other construction machines, such as a wheel loader, a dump truck, a lift truck, and the like.

The invention claimed is:

1. A construction machine comprising:
a vehicle frame which serves as a support structure and on a front side of which a working mechanism is mounted;
a counterweight disposed on a rear side of said vehicle frame;
an engine mounted on said vehicle frame by being located on a front side of said counterweight;
a muffler device to discharge exhaust gases from said engine;
a hydraulic pump disposed on one side, in a left-right direction, of said engine and driven by said engine, said muffler being located above said hydraulic pump;
a cooling fan for said engine and located on an opposite side, in the left-right direction, to said hydraulic pump and being operable to suck cooling air from the outside of the construction machine;
a heat exchanger disposed in face-to-face relation to said cooling fan by being located upstream of said cooling fan in a flowing direction of the cooling air; and
an exterior cover disposed on said vehicle frame to cover mounted equipment including said engine, said hydraulic pump, said muffler device and said heat exchanger, wherein:
said exterior cover includes an engine cover disposed over said engine in an un-openable state, a heat exchanger cover which is positioned over said heat exchanger and which heat exchanger cover is openable to expose said heat exchanger and further which is in juxtaposition with said engine cover in the left-right direction, which heat exchanger cover has an upper surface protruding upwardly from a peripheral portion of said heat exchanger cover above an upper surface of said engine cover, and a side cover disposed in face-to-face relation to said heat exchanger and being located on a side of said vehicle frame,
said heat exchanger cover having a heat exchanger cover air inlet port located on a side of said peripheral portion of said heat exchanger cover to suck outside air as cooling air, and one heat exchanger cover exhaust port located on a side of said heat exchanger cover remote from said heat exchanger cover inlet port to allow the cooling air which has passed through said heat exchanger to be exhausted in a horizontal direction above said engine cover,
an engine cover exhaust port for exhausting the cooling air disposed on said engine cover at a position further away from said engine in a left-right direction than said heat exchanger cover exhaust port, and wherein said engine cover exhaust port is disposed above said hydraulic pump, said heat exchanger cover exhaust port and said engine cover exhaust port being arranged in juxtaposition with each other in the left-right direction,
a fire wall positioned between said engine and said hydraulic pump, said fire wall being disposed within said exterior cover, and
a flow guide plate on said fire wall and having an inclined plate to guide the cooling air diagonally upward toward said engine cover exhaust port, to make the cooling air, which has passed around said engine and which is exhausted from said engine cover exhaust port, flow in a direction away from said heat exchanger cover inlet port, said flow guide plate being disposed above, and covering, said muffler device.

2. A construction machine according to claim 1, wherein said heat exchanger cover has a vertical surface which extends substantially vertically downward from said protruding upper surface toward an upper surface of said engine cover, and said one exhaust port is disposed in said vertical surface.

3. A construction machine according to claim 1, wherein said counterweight is constituted by a central weight portion having a large height dimension and left and right lateral weight portions which are curved and extended toward the front side from said central weight portion in the left-right direction, and
the rear side of said heat exchanger cover is disposed on an upper surface side of said central weight portion.

4. A construction machine according to claim 1, further comprising an automotive lower traveling structure, an upper revolving structure which is swingably mounted on said lower traveling structure, and said working mechanism which is liftably mounted at a central portion in the left-right direction on a front side of said upper revolving structure, said vehicle frame is a revolving frame which constitutes said upper revolving structure and on a front side of which said working mechanism is mounted, said revolving frame being disposed with a cab located laterally of said working mechanism and having an operator's seat in which an operator is seated, said engine being located on the front side of said counterweight and being disposed transversely on said revolving frame in such a manner as to extend in the left-right direction, and said heat exchanger being disposed on a rear side of said cab between said engine and said side cover.

* * * * *